United States Patent [19]

Ewing et al.

[11] Patent Number: 5,424,924
[45] Date of Patent: Jun. 13, 1995

[54] ILLUMINATED VEHICLE BRA

[76] Inventors: Johnny W. G. Ewing; Robin R. Ewing, both of 2463A S. Graham St., Milwaukee, Wis. 53207

[21] Appl. No.: 204,963

[22] Filed: Mar. 2, 1994

[51] Int. Cl.⁶ .............................................. B60Q 1/00
[52] U.S. Cl. ..................................... 362/80; 362/252; 362/800; 362/812; 40/550; 40/556; 40/591
[58] Field of Search ................ 296/136; 280/770; 40/550, 556, 590, 591, 592; 362/61, 80, 82, 83.3, 800, 806, 812, 249, 251, 252

[56] References Cited

U.S. PATENT DOCUMENTS

| | | | |
|---|---|---|---|
| 2,921,180 | 1/1960 | Stiglin | 362/80 |
| 4,574,269 | 3/1986 | Miller | 40/550 |
| 4,607,444 | 8/1986 | Foster | 40/550 |
| 4,879,826 | 11/1989 | Wittke | 40/591 |
| 4,920,460 | 4/1990 | Mori | 362/80 |
| 5,056,817 | 10/1991 | Fuller | 280/770 |
| 5,132,883 | 7/1992 | La Lumandier | 362/82 |
| 5,263,272 | 11/1993 | Fogelman | 40/591 |

*Primary Examiner*—Ira S. Lazarus
*Assistant Examiner*—Alan B. Cariaso

[57] ABSTRACT

An illuminated vehicle bra for displaying a message comprising a nose bra adapted to fit on a vehicle; and a signaling circuit coupled to the nose bra, the signaling circuit having a plurality of light sources disposed thereon in a configuration defining a message for viewing and leads connected to the light sources for transferring energy for illuminating the message, the leads extending from the nose bra and terminating in a terminal adapted to be coupled to a power source for receiving power for energizing the signaling circuit.

3 Claims, 2 Drawing Sheets

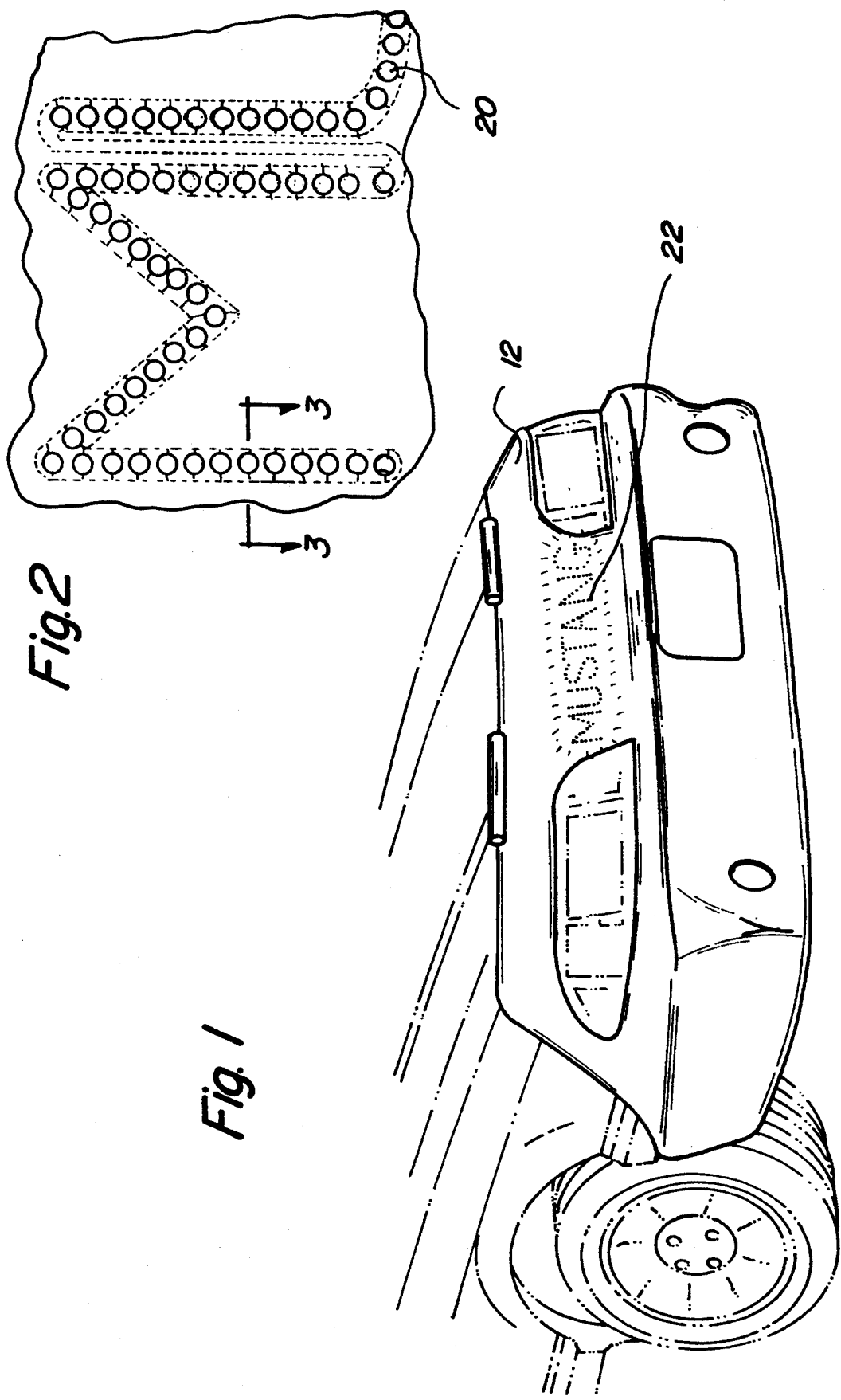

ILLUMINATED VEHICLE BRA

BACKGROUND OF THE INVENTION

1. Field of the Invention

The present invention relates to a illuminated vehicle bra and more particularly pertains to displaying a message with a illuminated vehicle bra.

2. Description of the Prior Art

The use of vehicular signaling devices is known in the prior art. More specifically, vehicular signaling devices heretofore devised and utilized for the purpose of displaying messages are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,965,950 to Yamada discloses a display device for automotive mark plate. U.S. Pat. No. 4,974,354 to Hembrook, Jr. discloses a visual display device for vehicles. U.S. Pat. No. 4,977,695 to Armbruster discloses an illuminated medallion. U.S. Pat. No. 5,005,306 to Kinstler discloses an illuminated vehicle sign. U.S. Pat. No. 5,157,377 to Wayne discloses a hood scoop assembly.

While these devices fulfill their respective, particular objective and requirements, the aforementioned patents do not describe a illuminated vehicle bra that displays a message when illuminated.

In this respect, the illuminated vehicle bra according to the present invention substantially departs from the conventional concepts and designs of the prior art, and in doing so provides an apparatus primarily developed for the purpose of displaying a message.

Therefore, it can be appreciated that there exists a continuing need for new and improved illuminated vehicle bra which can be used for displaying a message. In this regard, the present invention substantially fulfills this need.

SUMMARY OF THE INVENTION

In the view of the foregoing disadvantages inherent in the known types of vehicular signaling devices now present in the prior art, the present invention provides an improved illuminated vehicle bra. As such, the general purpose of the present invention, which will be described subsequently in greater detail, is to provide a new and improved illuminated vehicle bra and method which has all the advantages of the prior art and none of the disadvantages.

To attain this, the present invention essentially comprises, in combination, a nose bra adapted to fit on the front end of a vehicle, the nose bra having an exterior surface adapted to protect the front end of a vehicle against damage from objects projected thereat and an interior surface coupled to the exterior surface and adapted to be placed in contact with the front end of a vehicle for preventing damage to the vehicle's finish when the nose bra is secured thereto; and a signaling circuit disposed between the exterior surface and the interior surface of the nose bra, the signaling circuit having a plurality of light emitting diodes extending through the exterior surface in a configuration defining a message for viewing and electrical leads connected to the light emitting diodes for transferring electrical power for illuminating the message, the electrical leads extending from the nose bra and terminating in a terminal adapted to be coupled to an electrical power source for receiving electrical power for energizing the signaling circuit.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved illuminated vehicle bra which has all the advantages of the prior art vehicular signaling devices and none of the disadvantages.

It is another object of the present invention to provide a new and improved illuminated vehicle bra which may be easily and efficiently manufactured and marketed.

It is a further object of the present invention to provide a new and improved illuminated vehicle bra which is of durable and reliable construction.

An even further object of the present invention is to provide a new and improved illuminated vehicle bra which is susceptible of a low cost of manufacture with regard to both materials and labor, and which accordingly is then susceptible of low prices of sale to the consuming public, thereby making such a illuminated vehicle bra economically available to the buying public.

Still yet another object of the present invention is to provide a new and improved illuminated vehicle bra which provides in the apparatuses and methods of the prior art some of the advantages thereof, while simultaneously overcoming some of the disadvantages normally associated therewith.

Even still another object of the present invention is to provide a new and improved illuminated vehicle bra for displaying a message.

Lastly, it is an object of the present invention to provide a new and improved illuminated vehicle bra comprising a nose bra adapted to fit on a vehicle; and a signaling circuit coupled to the nose bra, the signaling circuit having a plurality of light sources disposed thereon in a configuration defining a message for viewing and leads connected to the light sources for transferring energy for illuminating the message, the leads extending from the nose bra and terminating in a terminal adapted to be coupled to a power source for receiving power for energizing the signaling circuit.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the illuminated vehicle bra constructed in accordance with the principles of the present invention.

FIG. 2 is an enlarged view of a portion of a message shown in FIG. 1.

The same reference numerals refer to the same parts through the various Figures.

DESCRIPTION OF THE PREFERRED EMBODIMENT

Figure 3:
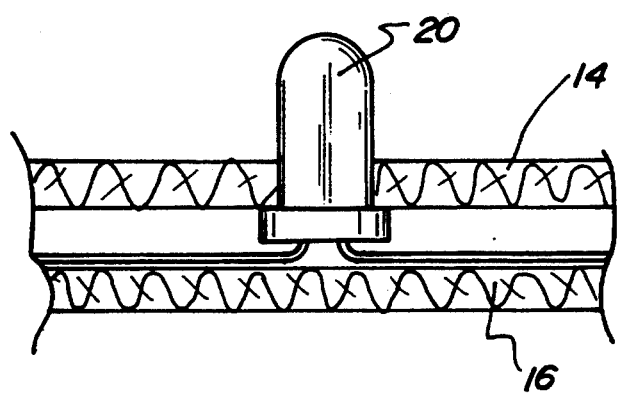
FIG. 3 is a view of a light source taken along the line 3—3 of FIG. 2.
Figure 4:
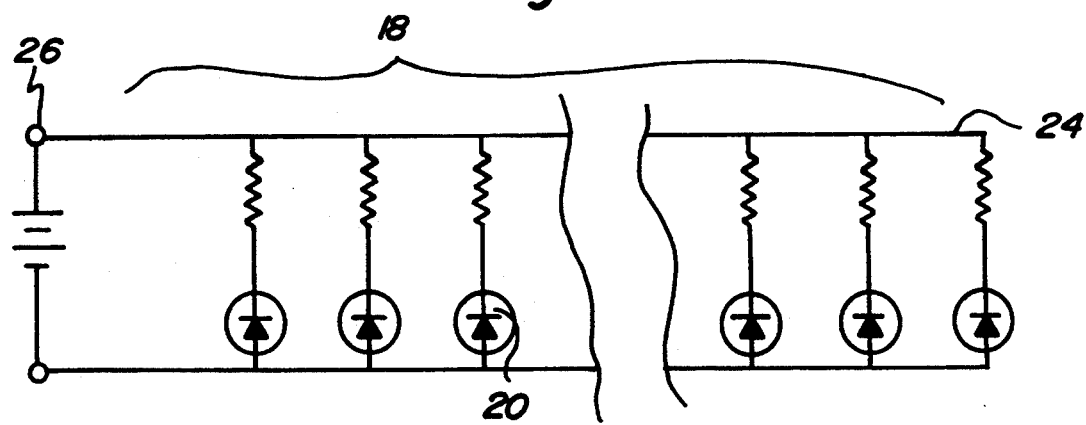
FIG. 4 is a schematic diagram of the signaling circuit of the present invention.

With reference now to the drawings, and in particular, to FIG. 1 thereof, the preferred embodiment of the new and improved illuminated vehicle bra embodying the principles and concepts of the present invention and generally designated by the reference number 10 will be described.

Specifically, the present invention includes two major components. The major components are nose bra and the signalling circuit. These components are interrelated to provide the intended function.

More specifically, it will be noted in the various Figures that the first major component is the nose bra 12. The nose bra generally concave-shaped and is sized to fit on and substantially cover and conform to the shape of a front end of a vehicle. The nose bra has an exterior surface 14. The exterior surface is adapted to protect the front end of a vehicle against damage from objects projected thereat while simultaneously enhancing its appearance. The nose bra also has an interior surface 16. The interior surface is coupled to the exterior surface. The interior surface is adapted to be placed in contact with the front end of a vehicle. The interior surface is used to prevent damage to the vehicle's finish once the nose bra is secured thereto.

The second major component is the signalling circuit 18. The signaling circuit is disposed between the exterior surface 14 and the interior surface 16 of the nose bra. The signaling circuit contains a plurality of light emitting diodes 20. These diodes extend through the exterior surface in a configuration defining a message 22 for viewing. The signalling circuit also includes electrical leads 24. The electrical leads are connected to the light emitting diodes. The electrical leads are used for transferring electrical power for illuminating the message. The electrical leads extend from the nose bra and terminate in a terminal 26. The terminal is adapted to be coupled to an electrical power source for receiving electrical power for energizing the signaling circuit.

In the preferred embodiment, the exterior surface of the nose bra is made of vinyl or leather. The exterior surface is adapted to let moisture escape and resist mildew. The exterior surface protects the front end of a vehicle from damage by gravel, rocks, insects, or other objects projected thereto. The bra is fashioned to be coupled to the front end of a vehicle yet allow the hood to be opened. The bra is also formed to allow pop-up headlights to operate freely. The interior surface of the bra is made of a soft flannel to protect the paint on the vehicle from chafing when the bra is coupled thereto. These features are conventional in design and available in existing nose bras. The bra can be formed to fit on a variety of vehicles such as sports cars, conventional cars, and trucks.

The signaling circuit is constructed with commercially available components. A variety of different light sources can be used, such as incandescent light bulbs or light emitting diodes. In the preferred embodiment, the light sources are formed with a series of small 1.2 volt light emitting diodes that generate light in the visible spectrum. The signaling circuit is energized in one orientation when the driving lights of a vehicle to which the present invention is coupled are activated or energized in another orientation with a separate switch available in the vehicle's driver compartment. Any number of messages may be formed with the light sources, and the dimensions of the messages are only limited by the size of the nose bra. For example, the make or type of vehicle may be formed in lights and illuminated. When using the 1.2 volt light emitting diodes, a step down transformer is utilized to convert power from a vehicle's 12 volt battery to an operable range. The present invention thus allows owners to personalize their cars while also protecting them.

In an alternate embodiment, the plurality of light sources can be formed in an array and controlled with circuitry for generating a plurality of user-controlled and personalized messages.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. An illuminated vehicle bra for displaying a message comprising, in combination:
    a generally concave-shaped nose bra sized to fit on and substantially cover and conform to the shape of a front end of a vehicle with a surface finish, the nose bra having an exterior surface for protecting the front end of the vehicle against damage from objects projected thereat while simultaneously enhancing the appearance of the front end of the vehicle and an interior surface coupled to the exterior surface for placement against the front end of the vehicle for preventing damage to the surface finish when the nose bra is secured thereto; and
    a signaling circuit disposed between the exterior surface and the interior surface of the nose bra, the signaling circuit having a plurality of light emitting diodes extending through the exterior surface in a configuration defining a message for viewing and electrical leads connected to the light emitting diodes for transferring electrical power for illuminating the message, the electrical leads extending from the nose bra and terminating in a terminal adapted to be coupled to an electrical power source for receiving electrical power for energizing the signaling circuit.

2. An illuminated vehicle bra for displaying a message comprising:
    a generally concave-shaped nose bra adapted to fit on and substantially cover and conform to the shape of a front end of a vehicle; and
    a signaling circuit coupled to the nose bra, the signaling circuit having a plurality of light sources disposed thereon in a configuration defining a message for viewing and leads connected to the light sources for transferring energy for illuminating the message, the leads extending from the nose bra and terminating in a terminal adapted to be coupled to a power source for receiving power for energizing the signaling circuit.

3. The device as set forth in claim 2 further including a transformer having an output terminal coupled to the terminal of the signaling circuit and an input terminal adapted to be coupled to a power source of a vehicle for receiving input electrical power therefrom and with the transformer converting the input electrical power to an output electrical power compatible for illuminating the light sources.

* * * * *